United States Patent
Korolev et al.

(10) Patent No.: US 9,104,972 B1
(45) Date of Patent: Aug. 11, 2015

(54) CLASSIFYING DOCUMENTS USING MULTIPLE CLASSIFIERS

(71) Applicant: Google Inc., Mountain View, CA (US)

(72) Inventors: Dmitry Korolev, Unteriberg (CH); Hartmut Maennel, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/223,632

(22) Filed: Mar. 24, 2014

Related U.S. Application Data

(63) Continuation of application No. 12/404,089, filed on Mar. 13, 2009, now Pat. No. 8,713,007.

(51) Int. Cl.
*G06F 17/30* (2006.01)
*G06N 5/04* (2006.01)
*G06N 99/00* (2010.01)

(52) U.S. Cl.
CPC .............. *G06N 5/048* (2013.01); *G06N 99/005* (2013.01)

(58) Field of Classification Search
CPC ................................................. G06F 17/30477
USPC .......................... 707/705, 708, 713, 729, 731
See application file for complete search history.

(56) References Cited

U.S. PATENT DOCUMENTS

| | | | | |
|---|---|---|---|---|
| 6,137,911 A * | 10/2000 | Zhilyaev | | 382/225 |
| 7,117,149 B1 * | 10/2006 | Zakarauskas | | 704/233 |
| 7,155,668 B2 * | 12/2006 | Holland et al. | | 715/256 |
| 7,899,816 B2 | 3/2011 | Kolo et al. | | |
| 8,495,002 B2 * | 7/2013 | Nelken et al. | | 706/62 |
| 2004/0249796 A1 | 12/2004 | Azzam | | |
| 2005/0027664 A1 * | 2/2005 | Johnson et al. | | 706/12 |
| 2005/0065919 A1 * | 3/2005 | Gotoh et al. | | 707/3 |
| 2005/0216443 A1 * | 9/2005 | Morton et al. | | 707/3 |
| 2006/0004748 A1 * | 1/2006 | Ramarathnam et al. | | 707/6 |
| 2006/0085767 A1 * | 4/2006 | Hinckley et al. | | 715/863 |
| 2006/0123000 A1 | 6/2006 | Baxter et al. | | |
| 2006/0184521 A1 | 8/2006 | Ponte | | |
| 2006/0218134 A1 * | 9/2006 | Simske et al. | | 707/4 |
| 2007/0038625 A1 | 2/2007 | Yang-Stephens et al. | | |

(Continued)

OTHER PUBLICATIONS

Angelov, S., Harb, B., Kannan, S., and Wang, L., "Weighted Isotonic Regression under the $L_1$ Norm," in: Proceeding of the seventeenth annual ACM-SIAM symposium on Discrete algorithm, Miami, FL., 2006, pp. 783-791, http://portal.acm.org/citation.cfm?id=1109643.

(Continued)

*Primary Examiner* — Noosha Arjomandi
(74) *Attorney, Agent, or Firm* — Fish & Richardson P.C.

(57) ABSTRACT

Methods, systems, and apparatus, including computer programs encoded on computer storage media, for classifying resources using scores from multiple classifiers. In general, one aspect of the subject matter described in this specification can be embodied in methods that include the actions of receiving identifying a collection of documents to classify; receiving a plurality of classifiers for scoring a document with respect to a specified property; for each document in the collection, applying each of the plurality of classifiers, each classifier generating a score associated with a likelihood that the document has the specified property, combining the scores from each classifier including applying a multiple classifier model that uses monotonic regression to combine the plurality of classifiers, and classifying the document as having the specified property based on the combined score.

20 Claims, 6 Drawing Sheets

(56) References Cited

U.S. PATENT DOCUMENTS

| | | |
|---|---|---|
| 2007/0112756 A1 | 5/2007 | Wen et al. |
| 2007/0150472 A1 | 6/2007 | Cao et al. |
| 2007/0198447 A1* | 8/2007 | Tilford et al. .................. 706/20 |
| 2008/0059448 A1 | 3/2008 | Chang et al. |
| 2009/0116756 A1 | 5/2009 | Neogi et al. |

OTHER PUBLICATIONS

Cormen, T., Leiserson, C., Rivest, R., Stein, C., "Introduction to Algorithms," Chapter 26, (2nd ed., MIT Press and McGraw-Hill 2001), 58 pages.

Goldberg, A., and Rao, S., "Length Functions for Flow Computations," Technical Report #97-055, NEC Research Institute, Inc., Aug. 1997, 19 pages.

Maxwell, W. and Muckstadt, J., "Establishing Consistent and Realistic Reorder Intervals in Production-Distribution Systems," Operations Research, vol. 33, No. 6, Nov.-Dec. 1985, pp. 1316-1341.

van Leeuwen, J., "Graph Algorithms, 1.4. Transitive reduction and transitive closure," in: Handbook of Theoretical Computer Science, vol. A: Algorithms and Complexity, Elsevier / MIT Press 1994, 10 pages.

Zadrozny, B. and Elkan, C., "Transforming Classifier Scores into Accurate Multiclass Probability Estimates," Proceedings of the Eighth ACM SIGKDD International Conference on Knowledge Discovery and Data Mining, Edmonton, Alberta, Canada, 2002, pp. 694-699.

\* cited by examiner

CLASSIFYING DOCUMENTS USING MULTIPLE CLASSIFIERS

CROSS REFERENCE TO RELATED APPLICATIONS

This application is a continuation application of, and claims priority to, pending U.S. patent application Ser. No. 12/404,089, filed on Mar. 13, 2009, entitled "Classifying Documents Using Multiple Classifiers," the entire contents of which are herein incorporated by reference.

BACKGROUND

This specification relates to classifying documents using scores from multiple classifiers.

Documents (e.g., Web pages or Web sites) can be classified according to one or more document properties. These classified documents can then be treated differently, for example, by a search engine or other information retrieval techniques. For example, a document property can be content of a special topic of interest, either because the topic is particularly desirable (e.g. financial sites would like to show detailed information about companies' business performance) or because the topic is undesirable (e.g. pornographic content ("porn") or depictions of violence may be undesired in particular circumstances). Undesired documents can be filtered out from search results while desirable documents can be shown with a preference over documents having uncertain or different topics.

Documents can be classified according to different techniques. For example, human raters can be used to manually classify documents as having a specified property. While highly accurate, this is very time consuming for large numbers of documents (e.g., a collection of Web documents).

Alternatively, automatic classifiers can flag documents as likely having the particular property. Typically, the classifiers examine the documents for particular types of content, for example, images or text. However, conventional automatic classifiers often do not provide a likelihood that a document has the specified property with a confidence level sufficient to allow automatic actions. In particular, if there are classification systems on both the level of Web pages and Web sites, an action on the site level would affect all pages of that site, so an action on the site level has to have a very high confidence. If the Web site as a whole cannot be classified with high confidence, it may be preferable to classify the individual pages based on their individual content. In general this is more difficult because there is less information upon which to base the classification.

SUMMARY

This specification describes technologies relating to classifying documents using multiple classifiers.

In general, one aspect of the subject matter described in this specification can be embodied in methods that include the actions of selecting a collection of documents to classify; selecting multiple classifiers for scoring a document with respect to a specified property; for each document in the collection, applying each of the multiple classifiers, each classifier generating a score associated with a likelihood that the document has the specified property, combining the scores from each classifier including applying a multiple classifier model that uses monotonic regression to combine the multiple classifiers, and classifying the document as having the specified property based on the combined score. Other embodiments of this aspect include corresponding systems, apparatus, and computer program products.

These and other embodiments can optionally include one or more of the following features. The method further includes generating a list of documents including the collection classified as having the specified property. The method further includes receiving a search query; identifying resources responsive to the search query; generating initial search results identifying the resources responsive to the search query; filtering the initial search results based on resources corresponding to entries in the list to produce filtered search results; and presenting filtered search results in response to the received search query. Filtering includes removing search results corresponding to entries in the list. Filtering includes removing search results that do not match entries in the list.

The method further includes generating the probability model including: identifying a group of documents to be classified with respect to the specified property; calculating scores for each document of the group of documents using the multiple classifiers; identifying a training group of documents from the group of documents; determining whether each document in the training group of documents has the specified property; and generating the multiple classifier model using the training group of documents, the generating including calculating a monotonic regression from the maximum likelihood estimate.

Identifying the training group of documents further includes creating a partition of a value set for each classifier into smaller intervals; assigning each document to a bucket based on intervals in which the classifier outputs lie; iterating bucket assignments to satisfy one or more constraints on the group of training documents; and selecting the group of training documents according to bucket.

Each document of the training group of documents is rated by a human rater with respect to the specified property. Generating the multiple classifier model further includes using specific classifier scores from the training group of documents to calculate the monotonic regression that maximizes the likelihood for multiple classifier scores identifying a particular outcome probability that a given document has the specified property. The multiple classifier model uses a transitive reduction of monotonicity constraints. The method further includes assigning a probability to the combined score for the document, where classifying the document includes comparing the probability with a threshold value and when the score is greater than the threshold, classifying the document as having the specified property. Combining the scores includes using the individual classifier scores from a training group of documents to identify n training documents having scores monotonically below the document and using the scores of those n training documents to calculate the combined score.

Particular embodiments of the subject matter described in this specification can be implemented so as to realize one or more of the following advantages. Documents are classified with a high confidence. While a seed set of documents is classified by human raters to train the classification system, once system is built, documents can be classified without evaluation by human raters. The classification process gives each document a probability that the document has the desired property. Thus, users of this classification scheme can perform different actions on classified documents based on the level of confidence they need. The result can be provided as a probability such that the result has an intuitive meaning and it is easy for users to specify a desired threshold level. Providing the result in the form of probability also eliminates output calibration processes.

New individual classifiers can be added and previously used classifiers can be disabled without affecting the scale of the output. The classification is based on scores (numbers) output by different classifiers, but these scores do not need to be comparable to each other or normalized in a certain way. Instead, the only required information is that for a given classifier, the document is more likely to have the property than another document. The classification is computationally feasible even for large seed sets (e.g., a model based on 100,000 seed documents can be computed on a single PC in minutes). Combining classifiers with monotonic regression can increase precision over other multiple classifier techniques.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
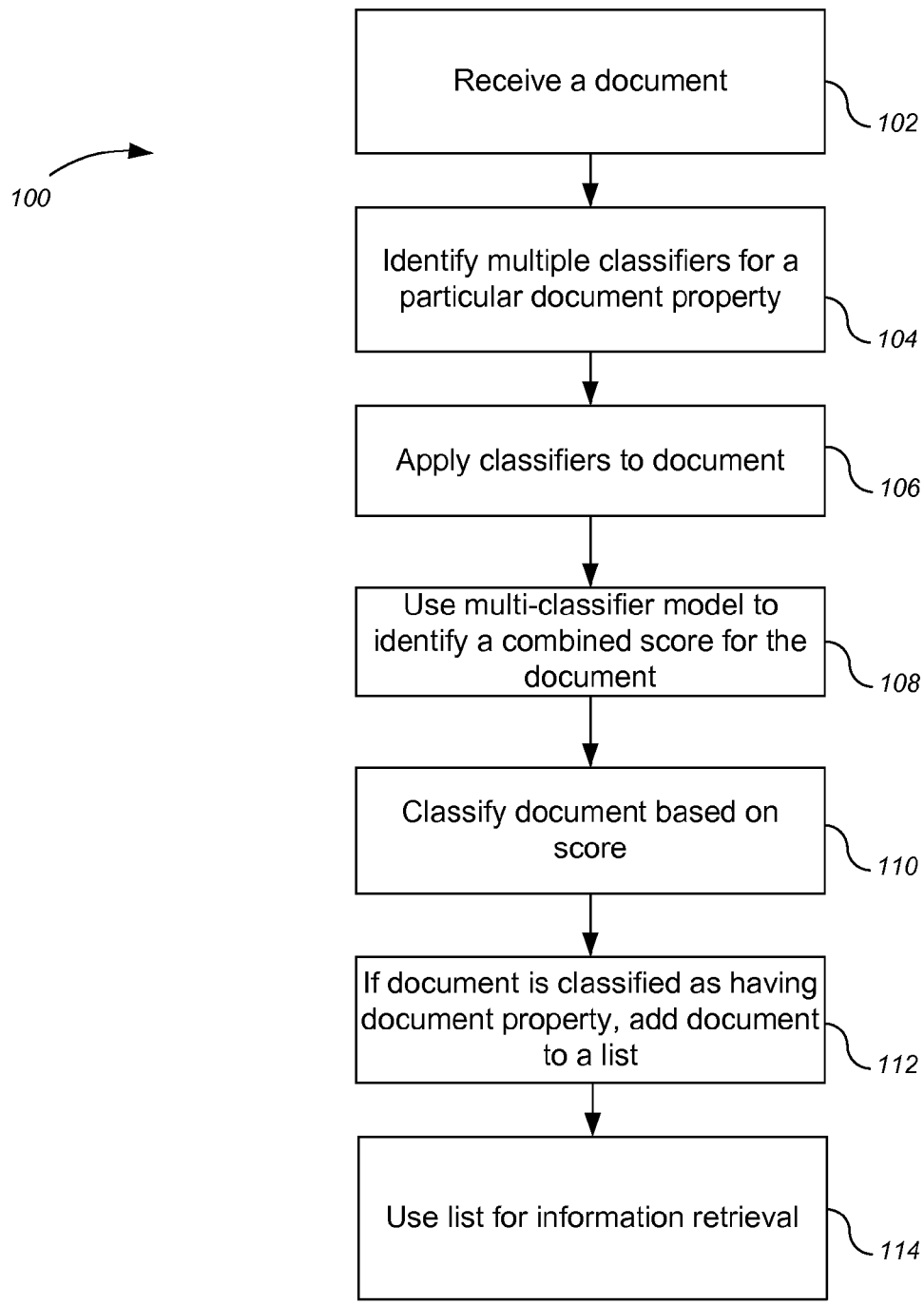
FIG. 1 is flowchart showing an example method for classifying documents using scores from multiple classifiers.

FIG. 1 is flowchart showing an example method 100 for classifying documents using scores from multiple classifiers. For convenience, the method 100 will be described with respect to a system that performs the method 100.

The system receives 102 a document. In particular, the system can receive the document from a collection of documents to be classified. For example, the document can be a Web document from a collection of unclassified Web documents. Alternatively, in some implementations, the document includes all of the resources for a particular Web site (e.g., individual Web pages, images, and other multimedia content of the Web site).

The system can classify each document as having one or more properties. For clarity, the method 100 will be described with respect to classifying a single document relative to a specific property. For example, the property can be whether or not the document includes financial information or whether or not the document includes porn content. If the property is porn, the document is classified as either being porn or not porn (e.g., a Boolean classification is made for the document as either being porn or not being porn).

Other document properties can be the subject of classification. For example, documents can be classified for different document topics including sports, research topics, commercial sites, and celebrity gossip.

The system identifies multiple classifiers 104 for the specified document property. In particular, if the specific property being classified is porn, the system identifies multiple porn classifiers. Different classifiers can be used to determine a score indicating whether a document has the specified property based on an analysis of a particular type of content of the document. For example, a porn classifier can include text classifiers and image classifiers. The text classifier examines document text content to determine a likelihood that the document is porn while the image classifier examines document image content to determine a likelihood that the document is porn. In some implementations, the score is a probability while in other implementations the score is a numerical value (e.g., a number of words identified by the classifier). In some implementations, the system first identifies the types of content within the document and then identifies the corresponding classifiers. For example, the system can determine whether the document contains text before identifying a text classifier as one of the multiple classifiers for the document.

There are numerous ways to construct a classifier for a given type of content. For example, a text classifier can assign numbers for key words and add up all those numbers that occur in a given document. These numbers are positive for words that are likely to occur in the texts of documents associated with the property for classification. In some implementations, there are also negative values for words that are unlikely to occur in texts having the document property. The text classifier then sums all the numbers that correspond to words in the text of the document to be classified. If the sum is greater than a specified threshold, the text classifier indicates that the document is likely to have the property being classified. In general, the higher the number, the more likely it is that the document text is associated with the property being classified. Text classifiers can be applied to different parts of a document, for example, for a Web page different text classifiers can be applied to the title of the Web page, the actual text content of the Web page, and the URL of the Web page.

The system applies 106 each of the multiple classifiers to the document. Applying each classifier to the document (e.g., an image classifier and a text classifier) provides a particular result ("score") for each classifier indicating a likelihood as to whether, taken alone, the document is likely to have the specified property. For example, for a porn classifier, each result indicates the likelihood that the document is porn.

The system uses 108 a multiple classifier model to identify a combined score, which can be interpreted as a probability, for the document based on the individual classifier results. The multiple classifier model is described in greater detail below with respect to FIG. 2. The multiple classifier uses the scores for training documents to identify the score for an unknown input document. Identifying the combined score using the multiple classifier model for the document is also described in greater detail below.

The system classifies 110 the document based on the combined score. In particular, a threshold value can be specified. When the combined score is at or above the threshold value (indicating a specified level of confidence), the document is automatically classified as having the specified property (e.g., porn). When the combined score is below the specified threshold, the document is automatically classified as not having the specified property (e.g., not porn). For example, a threshold of 50% probability can be set for classifying documents as having the specified property.

Alternatively, in some implementations, both a high threshold and a low threshold are used. Documents with combined scores at or above the high threshold (e.g., 98%) are automatically classified as having the specified property. Documents with a combined score at or below the low threshold (e.g., 10%) are automatically classified as not having the specified property. However, documents with a combined score between the low threshold and the high threshold are sent to one or more human raters for classification.

If the document is classified as having the property, the system adds 112 the document to a list. In some implementations, the list is a blacklist. When the particular document property being classified is a property used to filter information retrieval in a restricted mode (e.g., a safe search), the document can be added to the blacklist so that information retrieval results (e.g., Web search results) can be filtered. For example, documents classified as porn can be added to the blacklist so that a user search under a safe search mode can have search results filtered according to the blacklist such that no porn documents are identified in the search results. The blacklist can identify all resources associated with the document (e.g., web pages and images from a particular web site corresponding to the document). The blacklist is stored for future use (e.g., in filtering search results).

The system can add the document to a type of list other than a blacklist. In some implementations, the system adds the documents to a list for presentation. For example, the document property being classified can be a particular topic. Documents associated with the topic can be added to the list. Identifiers for one or more of these documents can be presented to a user (e.g., as links to the corresponding documents). For example, the property being classified can be "finance" and one or more of the listed finance documents can be identified in response to a particular user request.

The system uses 114 the list in information retrieval. For example, as described above, the blacklist can be used to filter search results to eliminate search results identifying resources associated with a blacklisted document. An example of searching is described below with respect to FIG. 4.

Figure 2:
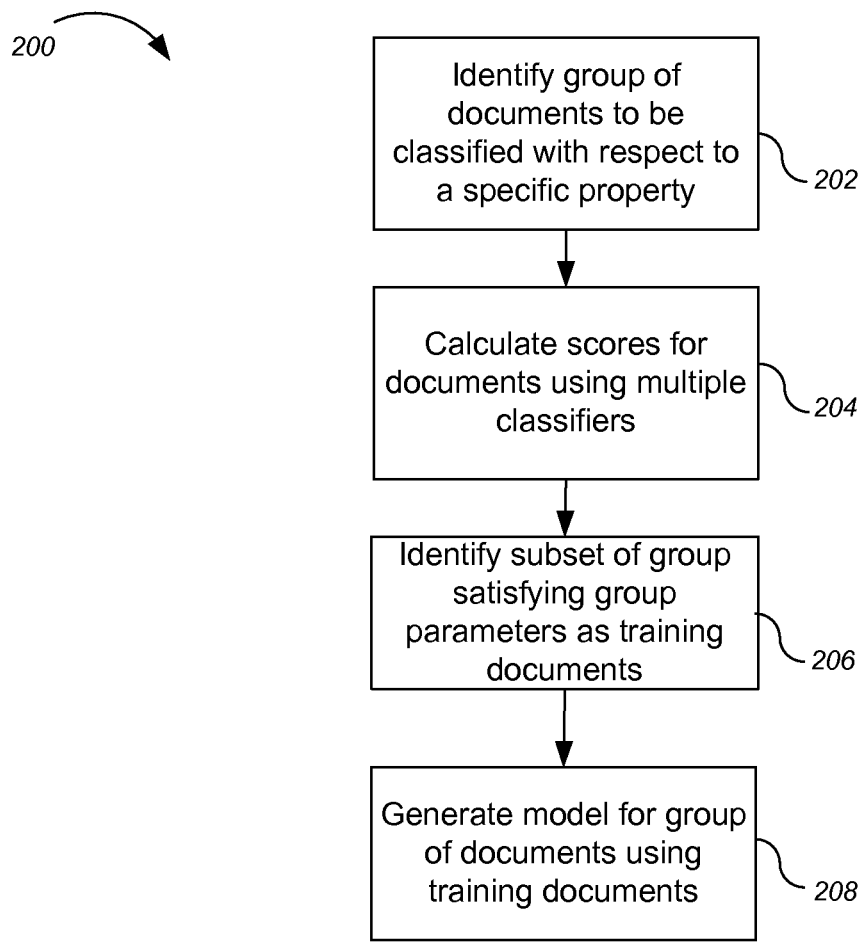
FIG. 2 is a flowchart showing an example method for modeling combined classifiers to provide an output probability result.

FIG. 2 is a flowchart showing an example method 200 for modeling combined classifiers to provide an output score for a document. For convenience, the method 200 will be described with respect to a system that performs the method 200.

The system identifies 202 a group of documents to be classified. The group of documents can include a collection of Web sites to be classified as having the specified property. For example, the group of documents can be Web sites to be classified as porn or not porn.

The system calculates 204 scores for documents using multiple classifiers. The system uses multiple classifiers that indicate whether a document is likely to have the specified property. The classifiers can examine different content of the documents, for example, text or image content of each document. Each classifier generates a score for the document that indicates the likelihood that the document has the property. Generally, a higher score indicates a higher likelihood that the document has the property.

The system selects 206 a subgroup of documents of the group of documents as a group of training documents. For example, the subgroup of documents can be a group of documents with known classifier scores and known determinations as to whether the respective documents of the subgroup have the specified property of interest (e.g., as a result of human raters determining whether each document of the group of training documents has the specified property of interest). In some implementations, the subgroup of documents includes documents that have been rated by human raters to determine whether or not the document has the specified property.

Figure 3:
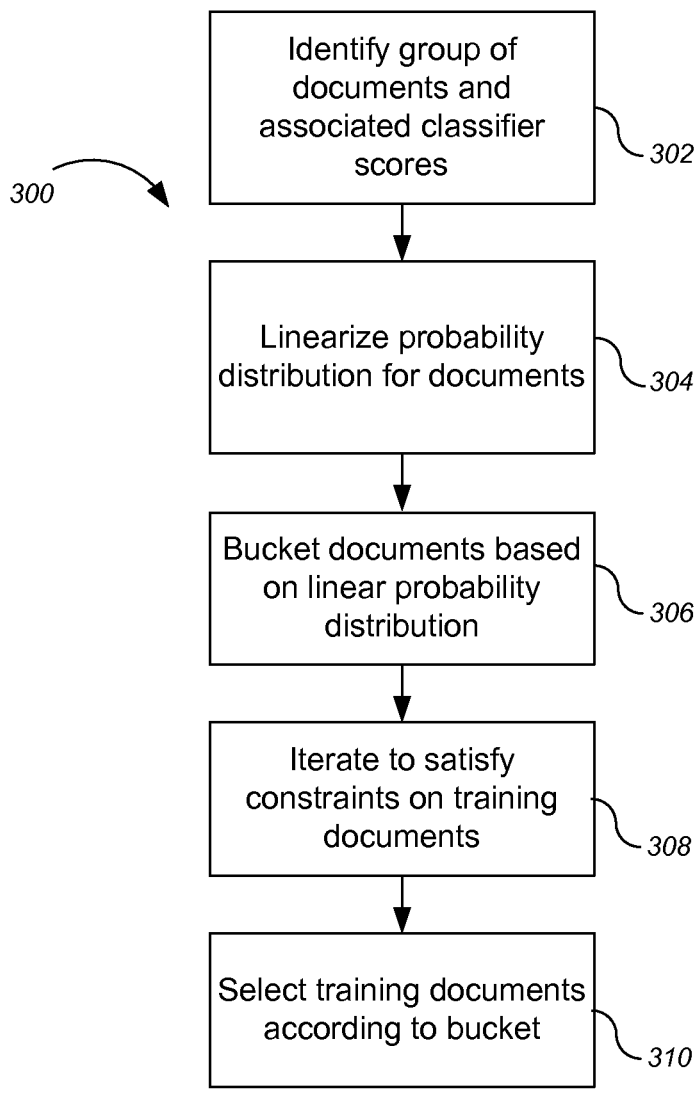
FIG. 3 is a flowchart showing an example method of selecting a group of training documents.

In some implementations, each training document is selected such that the group of training documents satisfies particular parameters. FIG. 3 is a flowchart showing an example method 300 of selecting a group of training documents. For convenience, the method 300 will be described with respect to a system that performs the method 300.

The system identifies 302 a collection of documents to be classified and associated classifier scores. The system generates 304 a linearized probability distribution for the identified documents based on their classifier scores. The scores for each document can be normalized before the probability distribution is linearized. The system assigns 306 each document to a particular bucket based on the linearized probability distribution. In some implementations, the number of buckets is chosen such that each bucket only contains a small number of documents (e.g., less than 10). The system iterates 306 a number of buckets and a number of selected training documents until particular parameters are satisfied. For example, such that a specified number of N documents are chosen for the training group and that the ratio of documents having the property of interest is close to 50% (including manual rating of a sample of the documents). The system selects 310 training documents from each bucket after the parameters have been satisfied. For example, an equal number of documents can be selected from each bucket to reach a total of N documents. A more detailed description of the process for selecting the group of training documents is provided below.

As shown in FIG. 2, the system generates 208 a multiple classifier model for combining classifiers to generate a combined results for the training group documents corresponding to the known results. Generating the multiple classifier model includes determining a maximum likelihood probability function for set of classifiers. The multiple classifier model uses the specific scores from the training set to calculate a monotonic regression that maximizes the likelihood for multiple classifier scores identifying a particular outcome probability that a given document has the specified property. Generating the multiple classifier model is described in greater detail below.

Figure 4:
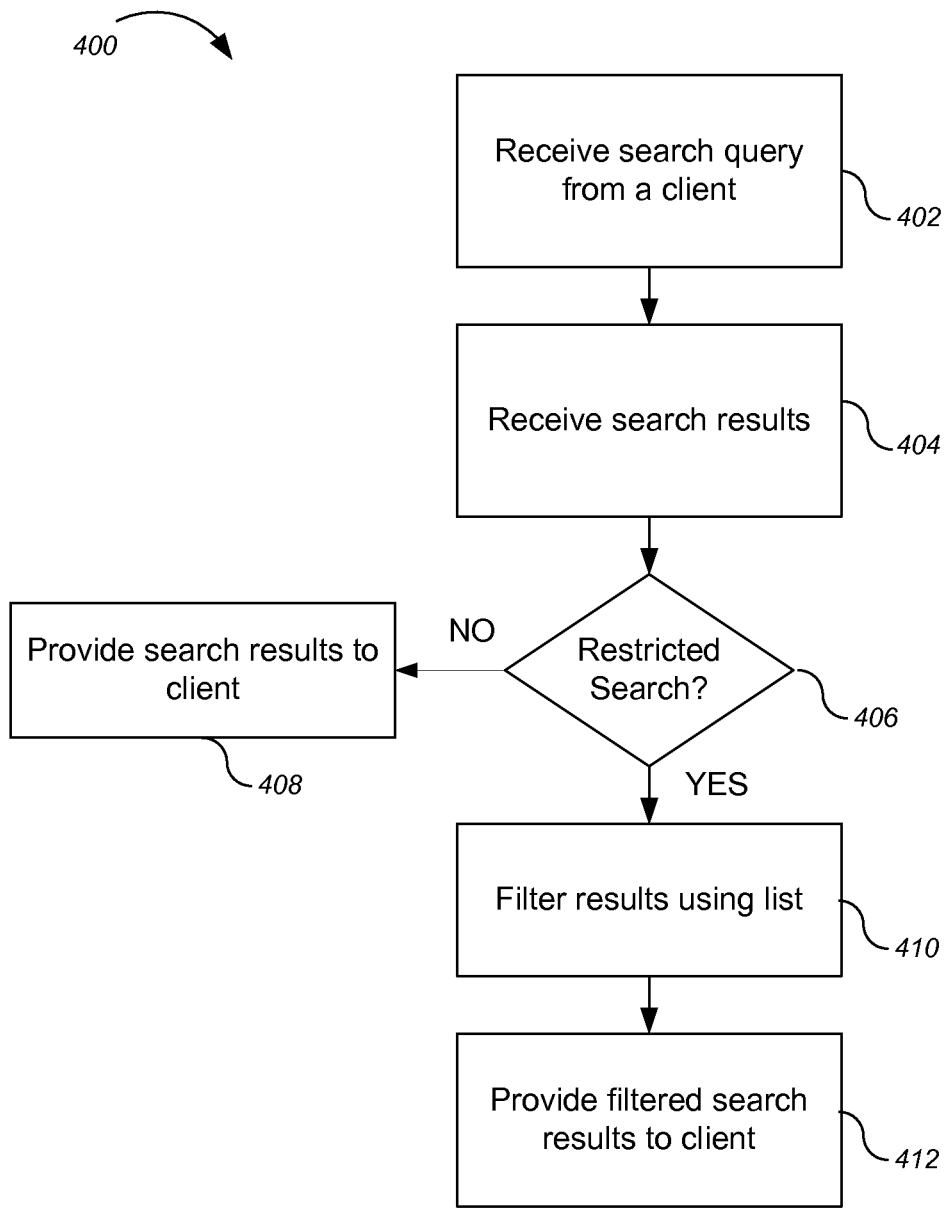
FIG. 4 is a flowchart showing an example method of providing search results.

FIG. 4 is a flowchart showing an example method 400 of providing filtered search results using a list based on an identified property of interest. For convenience, the method 400 will be described with respect to a system (e.g., a search system) that performs the method 400.

The system receives 402 a search query. For example, the system can receive the search query from a user of a client device. The user can input the search query to a search interface displayed on a client browser. The system provides the query to a search engine, either locally or remotely, that identifies resources responsive to the search query.

The system receives 404 search results responsive to the search query. For example, the system can receive a set of search results from the search engine. The set of search results include identifiers for the resources responsive to the search query. In some implementations, the search results further include a link to each identified resource and snippets of content from the respective resource.

The system determines 406 whether a restricted search is being performed. For example, a restricted search based on a specific document property or a restricted "safe search" mode for limiting results based on the property of interest can be selected by a user through the search interface. The safe search mode can filter search results that reference resources identified as having a particular property (e.g., resources associated with documents classified as porn).

When the system determines that a restricted search is not being performed, the system provides 408 the search results to the client for presentation (e.g., as an ordered set of results by the client browser).

When the system determines that a restricted search is being performed, the system filters 410 the search results using a list. The list identifies documents, and therefore their associated resources, used for the restricted search. For example, the list can identify resources associated with documents having a finance property that should be identified for a user in response to a search restricted to finance documents. In another example, if the restricted search is one that should limit results (e.g., porn), the list is used to identify resources that should not be identified in search results (e.g., a blacklist).

For example, the list can identify documents classified as porn. Any resources associated with the list documents can be identified from the list document. The system compares the resources of the search results with the list documents and removes any search results identifying resources associated with the list. For example, if a search result identifies a resource corresponding to an image associated with a Web site identified as porn, the image resource is filtered. The system provides 412 the filtered search results to the client for presentation.

Figure 5:
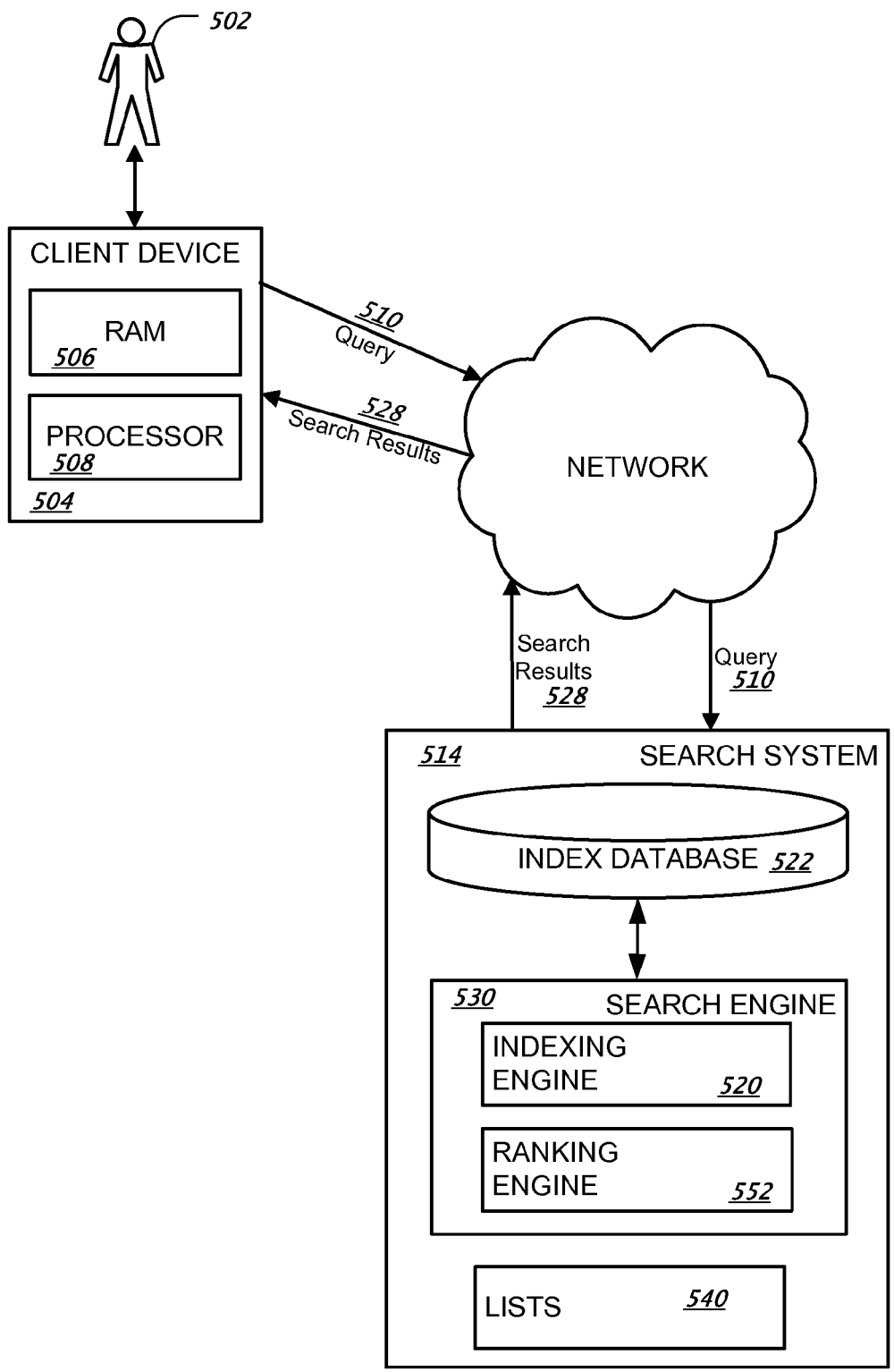
FIG. 5 shows a block diagram of an example search system.

FIG. 5 illustrates an example search system 514 for providing search results relevant to submitted queries as can be implemented in an internet, an intranet, or another client and server environment. The search system 514 is an example of an information retrieval system in which the systems, components, and techniques described below can be implemented.

A user 502 can interact with the search system 514 through a client device 504. For example, the client 504 can be a computer coupled to the search system 514 through a local area network (LAN) or wide area network (WAN), e.g., the Internet. In some implementations, the search system 514 and the client device 504 can be one machine. For example, a user can install a desktop search application on the client device 504. The client device 504 will generally include a random access memory (RAM) 506 and a processor 508.

A user 502 can submit a query 510 to a search engine 530 within a search system 514. When the user 502 submits a query 510, the query 510 is transmitted through a network to the search system 114. The search system 514 can be implemented as, for example, computer programs running on one or more computers in one or more locations that are coupled to each other through a network. The search system 514 includes an index database 522 and a search engine 530. The search system 514 responds to the query 510 by generating search results 528, which are transmitted through the network to the client device 504 in a form that can be presented to the user 502 (e.g., a search results web page to be displayed in a web browser running on the client device 504).

When the query 510 is received by the search engine 530, the search engine 530 identifies resources that match the query 510. The search engine 530 may also identify a particular "snippet" or section of each resource that is relevant to the query. The search engine 530 will generally include an indexing engine 520 that indexes resources (e.g., web pages, images, or news articles on the Internet) found in a corpus (e.g., a collection or repository of content), an index database 522 that stores the index information, and a ranking engine 552 (or other software) to rank the resources that match the query 510. The indexing and ranking of the resources can be performed using conventional techniques. The search engine 530 can transmit the search results 528 through the network to the client device 504, for example, for presentation to the user 502.

The search system 514 may also maintain one or more user search histories based on the queries it receives from a user. Generally speaking, a user search history stores a sequence of queries received from a user. User search histories may also include additional information such as which results were selected after a search was performed and how long each selected result was viewed.

In some implementations, the search system 514 includes one or more lists 540. The lists 540 each identify resources, in particular Web pages or Web sites, that have been classified as having a specified property (e.g., porn, finance, sports). Under specified circumstances, for example, when a user has indicated that a restricted search is to be performed, the resources identified by the search engine 530 are compared with the resources identified by the list 540 corresponding to the restricted search. In particular, the search results 528 can be filtered to remove results identifying resources that are not associated with the list 540 or, alternatively, that are associated with the list 540.

Modeling Maximum Likelihood Probability Function for Multiple Classifiers

For a collection of documents that potentially have a specified property there is a set of d classifiers that each provide a likelihood that a particular document has the property. Each classifier (e.g., a text classifier or an image classifier) provides an output score (a result value represented by a real number). The higher the score, the more likely the document has the specified property.

The classifiers can be applied to a group of documents in the collection to determine scores for those documents and human raters can determine which documents really have the specified property. Using this input of rated documents, an estimate is then made for the probability function that combines multiple classifiers to provide a combined score for a new input document based on its classifier scores.

Mathematically, for a given probability space X there are d classifier functions $S_i: X \rightarrow R$ and a function $Y: X \rightarrow \{0, 1\}$. Thus, each classifier function $S_i$ provides an output score that is a real number and the special property that documents can have is modeled as a Boolean result $\{0, 1\}$ that specifies that the document x either has the specified value ("Y(x)=1") or does not have the specified value ("Y(x)=0").

The conditional joint probabilities $p(s_1, \ldots, s_d)$=$P(Y=1|S_1=s_1, \ldots, S_d=s_d)$ are monotonically increasing for each of the d parameters (classifiers 1, ..., d). Each $s_i$ represents a real number (output of a classifier), for example, a word count in a word classifier function $S_i$ used to calculate a score for the classifier. Therefore, the likelihood that the document is classified as having the property is defined as a function of each individual classifier score. These probabilities are assumed to be monotonically increasing, i.e. the higher the score for each classifier, the more likely that the document has the property being evaluated by the classifier (e.g., for a porn classifier, the higher the classifier score, the greater the likelihood that the document is porn).

The classifiers are applied to a group of N documents. For each document there are a set of parameters corresponding to the classifier functions applied to each document of the N documents, $s_1(i), \ldots, s_d(i)$ for $i=1, \ldots, N$. Thus, for a first document (i=1) a parameter from each individual classifier (e.g., $s_1(1), s_2(1)$) is calculated. Thus, a parameter $s_1(1)$ can be a count from a text classifier and a parameter $s_2(1)$ can be a score from an image classifier for the same document. These parameters are used to determine a classifier score for the document (e.g., $S_1(1)$ and $S_2(1)$)

For the group of N documents that are human evaluated, $a_i=1$ if document i has the special property, and $a_i=0$ if the document i does not have the special property. Thus for each human evaluated document, there are d real values $s_i$, and one value $a_i$ that is either 0 or 1. Using the experimental data for the group of N documents, a maximum likelihood estimation for the conditional probabilities $p(s_1, \ldots, s_d)$ is derived.

The function p represents an estimate for a probability that a document has the property, given as only information the scores of the d classifiers. Estimating p given the information on $a_1, \ldots, a_N$, can be calculated using a maximum likelihood calculation to identify the p that gives the highest probability to observe the ratings $a_1, \ldots, a_N$ that were actually observed (e.g., as previously evaluated by human raters)

If we assume we know the function p, the probability of getting the output with all the observed values of $a_i$ is given by:

$$P(a_1, \ldots, a_N \mid p) \equiv \prod_{i=1}^{N} p(s_1(i), \ldots, s_d(i))^{a_i} (1 - p(s_1(i), \ldots, s_d(i)))^{(1-a_i)}.$$

Maximum likelihood estimation is a statistical method that can be used to fit a model to the experimental data. To apply this method, we have to find the monotonic function p of d variables that maximizes this probability. This condition only determines the values $p(s_1(i), \ldots, s_d(i))$ that appear in that formula. However, by the monotonicity constraint for each other value $s_1, \ldots, s_d$ at least an interval in which $p(s_1, \ldots, s_d)$ must lie can be calculated. If the training set includes at least a specified number of documents, these intervals are small and hence in practice will allow the probability $p(s_1, \ldots, s_d)$ to be calculated for all new documents with reasonable precision.

The Maximum Likelihood estimate for the function p can be calculated. Mathematically, maximizing the likelihood is equivalent to minimizing the (–log) of the likelihood, which can be written as:

$$-\log P(a_1, \ldots, a_N \mid p) = \sum_{i=1}^{N} a_i (\log(p(s_1(i), \ldots, s_d(i))) + (1 - a_i) \log(1 - p(s_1(i), \ldots, s_d(i))).$$

To minimize the log of the likelihood, the values of $p(s_1(i), \ldots, s_d(i))$ need to be determined. For each document i these can be defined as $x_i = p(s_1(i), \ldots, s_d(i))$. Additionally, $f_i(x)$ can be defined as $-a_i \log(x) - (1-a_i) \log(1-x)$ so that each of these functions is either $-\log(x)$ or $-\log(1-x)$. Thus, the (–log) likelihood can be rewritten as:

$$-\log P(a_1, \ldots, a_N \mid x_1, \ldots, x_N) = \sum_{i=1}^{N} -a_i \log(x_i) - (1-a_i) \log(1-x_i) = \sum_{i=1}^{N} f_i x_i.$$

These particular functions $f_i$ have their minimum at $a_1$. Without the monotonicity constraint, minimizing $$\sum_{i=1}^{N} f_i(x_i)$$

would be trivial: choose each $x_i$ to be its corresponding $a_1$. However, the monotonicity constraints need to be considered, namely that $x_i \leq x_j$ for certain pairs i, j.

To define the monotonicity constraint, let $i \leq j$ if $s_1(i) \leq s_1(j) \wedge \ldots \wedge s_d(i) \leq s_d(j)$ where $\wedge$ is the logical conjunction such that the inequalities must be true for each classifier S. A set V is defined as $\{1, 2, \ldots, N\}$ and E is a set of pairs (i,j) such that $\leq$ is the transitive reflexive closure of E. In other words, (V, E) is a directed graph and $i \leq j$ if and only if $i = j$ or there is a path from i to j in E. Thus, each entry in V is a vertex of the directed graph and represents, e.g., a document from the experiment group. An edge can be drawn from i to between vertices if the classifier scores indicate that document j is at least as likely to have the specified property as document i.

As an example, assume the classifiers identify the property of financial information in documents, for example in Web pages. The system can use two classifiers that assign to each Web page two integers: $s_1 = \#$ of technical financial words in the text and $s_2 = \#$ of links to known sites with financial information. Additionally, there is an assumption that the higher value of $s_1$, the more likely the web page is of interest (i.e., more likely to have the specified property of financial information). And similarly, the higher value of $s_2$, the more likely the Web page is of interest.

For example, if a Web page 1 has 2 financial terms and 1 link to financial pages, it will be of interest with a probability $p(2, 1) = x_i$. If a Web page 2 has 10 financial terms and 3 links to financial sites, such Web pages will be of interest with a probability $p(10, 3) = x_2$. Since Web page 2 contains both more financial terms and more links to financial sites than Web page 1, the monotonicity assumption gives $p(10, 3) \geq p(2, 1)$, or stated in terms of the "financial probabilities" for the pages: $x_2 \geq x_1$. In the directed graph an edge (i,j) is drawn from Web page 1 to Web page 2 since we know that Web page 2 is at least as likely to be interesting (i.e., have the specified property) as Web page 1.

The monotonicity requirement that establishes that $x_i \leq x_j$ for $i \leq j$ is equivalent to the requirement that $x_i \leq x_j$ for $(i, j) \in E$. As a result, the minimizing problem can be restated for a directed graph (V, E) where for each $i \in V$ there is a label $a_i \in \{0,1\}$. A vector x with components $x_i \in [0,1]$ for each $i \in V$ is identified that minimizes $$f(x) \equiv \sum_{i \in V} f_i(x_i)$$

under constraints $x_i \leq x_j$ for $(i, j) \in E$. Since each function $f_i$ is convex and the constraints are linear, this can be treated as a convex optimization problem. Additionally, the problem has a unique solution because the derivatives of the $f_i$'s are strictly increasing.

A general convex optimization technique can be used to find the minimum. However, the function $f$ is separable and the constraints involve only one or two coordinates. Given this, the minimum can be found by using a more efficient method described in Willima L. Maxwell and John A Muckstadt, *Establishing Consistent and Realistic Reorder Intervals in Production-Distribution Systems, Operations Research*, vol. 33, no. 6, pp. 1316-1341 (1985) for solving special convex optimization problems.

In particular, the approach of Maxwell and Muckstadt reduces the optimization problem to solving a maximum flow problem. Network flows and the maximum flow problem are described, for example, in Chapter 26 of Thomas H. Cormen, Charles E. Leiserson, Ronald L. Rivest, Cliffort Stain: Introduction to Algorithms ($2^{nd}$ ed., MIT Press and McGraw-Hill 2001). The resulting maximum flow problem can be solved efficiently since the corresponding network can be rescaled to involve only integers below $|V|$ and the system can perform a preprocessing step to reduce the number of edges from $O(|V|^2)$ to an expected number of $O(|V|\log(|V|)^{(d-1)})$. The preprocessing to reduce the number of edges is described in greater detail below.

Using a max flow algorithm suitable for these conditions, for example, as described by Andrew V. Goldberg and Satish Rao, *Length Functions for Flow Computations*, Technical Report #97-055, NEC Research Institute, Inc., August 1997, provides an upper bound of $O(M^{1.5}\log(N^2/M)\log(N))$, which for $N=|V|$ and $M=O(|V|\log(|V|)^{(d-1)})$ gives $O(N^{1.5}\log(N)^{(0.5+1.5 \cdot d)})$ instead of the $O(N^3)$ bound used in Maxwell and Muckstadt. This speed up obtained by the preprocessing step makes it feasible to run the algorithm on large data sets, e.g. the monotonic regression of 100000 points can be calculated in minutes on one PC.

The process for minimizing $$f(x) \equiv \sum_{i \in V} f_i(x_i)$$

with respect to the monotonicity constraints given by the directed graph (V, E) with vertices each labeled as either 0 or 1 to determine the optimal probability $x_i$ for each vertex document i (as derived from Maxwell and Muckstadt) can be written in pseudo code as follows:

Set active sets←{V} and result←{ }.
while active sets is not empty do
    Choose I from active sets and remove it.
    Try to split I into "left part" L and "right part" R.
    if it can be split then
        Add L and R to active sets.
    else
        Add I to result.
    end if
end while
for I in result do
    a←Number of points in I with label 1.
    b←Number of points in I with label 0.
    Set the output probability to a/(a+b) for each point in I.
end for In this process, the way that I is selected from the active sets does not matter (alternatively, the sets can be assessed in parallel). Each I has some number of points from V, e.g., some number of represented documents. The main part to be specified above is the splitting of a set of points (I). This is given by a minimal cut in the following network:

Let $I \subseteq V$ consist of a elements with label 1 and b elements with label 0. Then the network has as nodes the elements of I and two additional nodes s and t. The network also has arcs including an arc of capacity b from s to each of the a points with label 1, an arc of capacity a from each of the b points with label 0 to t and an arc of infinite capacity from i to j for each pair $(i,j) \in E \cap I \times I$.

If the max flow has capacity ab, a corresponding min cut separates s from all other points or t from all other points so it does not give a non-trivial composition of I. As a result, the set cannot be split. Otherwise a min cut gives a decomposition $I \cup \{s, t\} = (L \cup \{t\}) \cup (R \cup \{s\})$ that determines the sets L and R used above.

As shown in the pseudocode above, when no more I's selected from V can be split, the result for documents in each I is set to the empirical probability that a document of I has label 1, i.e. to the number of points in/with label 1 divided by the number of all points in I.

Optimization from Preprocessing

Instead of using as E the full set of pairs (i,j) with i≤j, the same result can be achieved for any other E' such that the full set is the transitive closure of E'. Let us denote by E in the following the full set of pairs (i,j) with i≤j. So depending on the how the min cut is performed, it can be faster to first compute a "transitive reduction" of (V, E). In order to define the transitive reduction of (V, E), let i, j from V be equivalent if (i,j) and (j, i) are both in E. This means they have the same vector of scores. Then the transitive reduction of E is the set of all (i, j) in E such that there exists no k in V with (i, k) and (k, j) in E and k not equivalent to i or j. (See J. van Leeuwen: Graph Algorithms, 1.4. Transitive reduction and transitive closure, in: Handbook of Theoretical Computer Science, Vol. A: Algorithms and Complexity, Elsevier/MIT Press 1994) This means the point i is either the same as point j or it is 'below' the point j, and there is no point 'in between' those points. A fast way to compute the transitive reduction of E is as follows:

Order V in lexicographical order of the score d-tuples, remove duplicates, and let t(i) be the index of i in this order. This means:
t(i)=t(j) if and only if i and j are equivalent, and
t(i)≤t(j) if (i,j) is in E (but in general we will also have t(i)≤t(j) for other (i,j).

As pseudo code, the technique to compute the transitive reduction is as follows:

for each i in V:
    Set result[i]←{ }.
    go through all j with t(j)>t(i) in the order given by t
    if (i,j) in E then
        for each k in result[i]:
        if (k,j) in E then
        continue with next j
        end if
    next k
    add j to result[i]
    end if
    next j
    for each j with t(j)=t(i):
    add j to result[i]
    next j
    Now result[i] contains exactly the j such that (i,j) is in the transitive reduction of E.
next i Obtaining the Initial Set of Documents for Constructing the Model In some implementations, a group of labeled documents to perform the initial model construction is selected from a larger group of documents ("universe") to be classified. A document is considered labeled if it is known whether it has or has not the desired property P. For example, if each document is a Web site, the universe is a collection of Web sites and some of these Web sites are provided to human raters who determine whether they have the property P. These training documents are then used to build the model. However, extra attention should be paid to the selection of the training documents. Drawing the training documents randomly from the universe will generally not results in a useful group of training documents R due to the following properties of the universe:

Property A.

In most cases, only a small fraction of documents will have the property P. For example, the ratio of financial sites or porn sites to all Web sites is rather small. A good group of the training documents should contain significant number of the documents both having and not having the property P. Thus, biased sampling should be used instead of the uniform sampling while selecting the documents that form the group of training documents. Generally, a set containing 50% of documents with property P would be good to learn the distinction between P and not P. If we are specifically interested in identifying a set of documents which we are very confident to have property P, then it makes sense to use even more of the documents which are likely to have property P.

Property B.

If the classifiers are good at predicting some property P, the outputs of individual classifiers are highly correlated, since they should predict the same property. This means that, for a random document from the universe, if its score from some individual classifier is high compared to the scores this individual classifier gives to the other documents in the universe, than the other individual classifiers are likely to score this document higher than the other documents. The method of sampling the documents from the universe to form the group of training documents should take the above statement into account and draw documents with various scores in order to achieve the better coverage of the scores space.

To overcome the issue of the documents in the universe having these properties, a bootstrapping process is used to identify a group of training documents (R), such that using them as a set of documents to build a model from will produce a model that covers the feature space described by the individual classifiers. Additionally, the bootstrapping technique satisfies three constraints:

Constraint 1.

Substantially half of the documents in R should have property P. (To compensate Property A)

Constraint 2.

R should contain documents with various combinations of scores from individual classifiers. (To compensate Property B)

Constraint 3.

The number of documents in R should be substantially N (a given integer number of documents which is determined e.g. by the human rater capacity or the cost of having N documents rated).

Given the properties and constraints, the bootstrapping process is formed as follows:

Let S be all documents in the universe. The bootstrapping process chooses the set R, as a subset of S that fits the constraints described above.

In some implementations, there are pre-requirements to running the bootstrapping process. In particular, some pre-requirements include a pre-requirement that the scores from all classifiers are pre-computed for all documents in S. Another pre-requirement is that there exists some estimate of what ratio of documents from S has the property P, referred to as Q below. (For example, coming from the previous experience with manually labeling a uniformly sampled subset of the universe). Additionally, another pre-requirement is that N is specified beforehand.

The following procedure is applied to choose R:

Set K to the smallest integer such that $K^d \geq N$. For each classifier, the system determines a small value $a_j$ such that documents with score $s_j < a_j$ are unlikely to have the property P and a high value $b_j$ such that documents with score $s_j > b_j$ are unlikely not to have property P, and a middle score $m_j$ such that the ratio of documents with score greater than $m_j$ is Q (since Q is the ratio of documents with property P, this means there are as many documents with score greater than $m_j$ that do not have property P as there are documents with score less than $m_j$ that have property P). Divide the intervals $[a_j, b_j]$ into K smaller intervals such that:

If K is even: $m_j$ is the highest point of the lower K/2 intervals and the lowest point of the higher K/2 intervals; and If K is odd: $m_j$ is in the middle interval.

This can be done by dividing the intervals $[a_j, m_j]$ and $[m_j, b_j]$ into K/2 equal pieces, whether that is appropriate depends on the classifier and its scores. A different scenario using quantiles instead is described below.

Assume a fixed scheme that gives for a given K and a set of $m_j$ partitions of the intervals $[a_j, b_j]$ into K smaller intervals $I_j^1$, $I_j^2, \ldots, I_j^K$. The system takes all products of the smaller intervals and identifies a document in each of these buckets, i.e. for each sequence $(i_1, i_2, \ldots, i_d)$ with from $\{1, 2, \ldots, K\}$ the system finds a document such that $s_1$ is in $I_1^{(i1)}$, $s_2$ is in $I_2^{(i2)}, \ldots, s_d$ is in $I_d^{(id)}$). This results in a collection of at most $K^d$ documents. In general, many of these buckets can be empty since e.g. there may be no document that classifier 1 considers almost certainly to have property P ($s_1$ is large), but classifier 2 considers highly likely not to have property P ($s_2$ is low).

If the number of documents is significantly lower than N, the system can repeat this procedure with higher K. More generally, the number of documents found with this method grows monotonically with K. To this monotonically increasing function the system can apply binary search to find a value of K such that the number of documents found is approximately N. This fulfils constraint 3, and by construction satisfies constraint 2.

While often constraint 1 will also be fulfilled because of the choice of $m_j$, the system can adjust also the $m_j$ like K if necessary. In particular, increasing one or several $m_j$ is expected not to change the number of documents substantially, but should increase the number of documents with property P. If the system is configured to increase all $m_j$ at the same time (e.g. by the same relative amount), the system can again appeal to monotonicity and binary search to find values $m_j$ such that roughly the same number of documents have property P or don't have property P. While an exact determination of the fraction of documents in R with property P would require human rater input, the system can, in practice, often just take a small sample to make sure that constraint 1 is substantially fulfilled.

The above way to construct the smaller score intervals given K and the $m_j$ assumes that dividing a score interval into K equal pieces is a meaningful operation—this may not always be the case, sometimes only the order relation between scores is meaningful. Another option is to use quantiles instead of scores; they remain invariant under monotonic transformation of the scores (but on the other hand they depend on the set of all documents considered). The quantile corresponding to $m_j$ is $F \equiv 1-Q$. Let $c_j$ be such that $a_j$ corresponds to the quantile $F^{c_j}$, then from $a_j < m_j$ we know that $c_j > 1$, and we can consider the quantile intervals given by the endpoints $$F^{c_j}, F^{(c_j \frac{(K-1)}{K})}, \ldots, F^{(c_j \frac{2}{K})}, F^{(\frac{c_j}{K})}, b_j$$

instead of the intervals given above.

Another variant is using fewer buckets (lower K), but allowing a certain number of documents into each bucket. Additionally, manual fine-tuning can be introduced, different values of K and F can be used for different classifiers. While manually looking at the sites, raters can have an idea about what scores are well covered and where improvements can be made to the classification. For example, raters can manually raise some K's by a factor of 1.5 . . . 2 to make sure all the dimensions are covered (e.g., to fulfill Constraint 2).

Missing Scores

Some documents do not have content applicable to all of the multiple classifiers being applied. For example, an image-based classifier would not provide a score on a document that does not include images. In some implementations, the system assigns a default score to classifiers that do not provide an output score. For example, if a system to detect financial sites uses as one signal an image classifier that determines the percentage or number of images that are charts, this classifier could output 0 for documents with no images.

Alternatively, in some other implementations, the system generates a modified probabilistic model that omits the classifier at issue from the probability function combining the classifiers. For n classifiers that could not output a classification for some documents (and that cannot use a default value), $2^n-1$ models are built, one for each non-empty subset of these classifiers. To build such a model for a subset S of classifiers, the system uses that subset of the human-rated data that has classifier outputs for all classifiers in S. So while those human-rated documents that have scores for all classifiers would be used for all $2^n-1$ models, for models for a set S the system also uses those documents that have not scores for all classifiers, but for all classifiers in S. When classifying a new document using these models, the system determines the set of classifiers that give an output for this document and applies the model corresponding to this set.

Applying the Multiple Classifier Model to Determine a Combined Score for a Document Given the multiple classifier model generated from a set of training documents with scores $s_1(i), \ldots, s_d(i)$ and the computed probabilities $p(i)$ that a document with these scores has the specified property, there are several ways to determine a probability for a new document with scores $s_1, \ldots, s_d$. The techniques use the assumed monotonicity of the probability in all scores $s_1, \ldots, s_d$.

Let $V_{upper}$ be the set of all training documents i that have scores $s_k(i) \geq s_k$ for k=1, 2, . . . , d. Arrange the computed probabilities $p(i)$ for i in $V_{upper}$ in ascending order, and call these $p_1, p_2, \ldots$. Then by monotonicity the probability $p(s_1, \ldots, s_d)$ should be lower than $p_1$. If $V_{upper}$ is empty, set $p_1=p_2=\ldots=1$. More generally $p_j$ can be set to 1 for $j>|V_{upper}|$.

Similarly, let $V_{lower}$ be the set of all training documents i which have all scores $s_k(i) \leq s_k$ for k=1, 2, . . . , d. Arrange the computed probabilities $p(i)$ for i in $V_{upper}$ in descending order, and call these $p_{-1}, p_{-2}, \ldots$. Then by monotonicity the probability $p(s_1, \ldots, s_d)$ should be greater than $p_{-1}$. If $V_{lower}$ is empty, set $p_{-1}=p_{-2}=\ldots=\ldots=0$. More generally $p_{-j}$ can be set to 0 for $j>|V_{lower}|$.

This gives, for each new document with given scores, an interval $[p_{-1}, p_1]$ in which the probability should lie (by construction of the probabilities $p_{-1} \leq p_1$). If there are a specified number of documents in the training set, this interval will be small and already give the sought probability with enough precision.

To obtain one number instead of an interval to assign to a new document, there are several possibilities: One technique is to simply use the mean $(p_{-1}+p_1)/2$. More generally, the system can take a linear combination of the probabilities by summing up $a_j \cdot p_j$ for $j=-k, \ldots, -1, 1, \ldots, k$ with coefficients $a_j \geq 0$ and divide by the sum of the $a_j$. The above is the special case k=1, $a_{-1}=a_1=1$. Distributing the total weight over more coefficients will generate a smoother function p, which can increase the accuracy of the estimate. However, such a scheme means that there is an additional parameter to tune. One possible choice for these coefficients would be $a_j=\exp(j^2/w)$ for some parameter w. If the estimate should be conservative, to make sure a high confidence threshold is satisfied in the classification if the computed probability is close to 1, $p_{-k}$ can be used for some constant k, e.g. k=20 as below. This is explained in more detail below with respect to detecting documents having a specified property with high confidence.

Detecting Documents Having a Specified Property with High Confidence

As an example, suppose there are two classifiers. The first classifier has scores on the range of 0, . . . , 5 and the second classifier has scores on the range of 0, . . . , 9. Table 1 shows the first classifier scores on the y-axis and the second classifier scores on the x-axis. Points on the table represent documents where a value "P" indicates the document has the property and "N" indicates that the document does not have the property. Additionally, Table 1 includes a document L of the training set and a document X as a new point to be classified.

TABLE 1

| 5 | P |   | N | P |   | P | P |   | P | P |
|---|---|---|---|---|---|---|---|---|---|---|
| 4 | N | P | N | P | P | N |   | P | P |   |
| 3 | P | N | N |   | N | P | N | P |   |   |
| 2 |   | N |   | N | N |   | N | N |   | X |
| 1 | N |   | N |   | N | N |   | N | L |   |
| 0 |   | N | P |   | N | N |   |   |   |   |
|   | 0 | 1 | 2 | 3 | 4 | 5 | 6 | 7 | 8 | 9 |

First suppose L is a point labeled with "P". Since all points above it also have the property, it will get the combined probability 1.0. (The terms "above" and "below" refer to the monotonicity requirement. For example, point A is lower than point B if they are not the same and if for all the individual classifiers that provide both A and B with the scores, the score for A is not greater than the score for B.) Since X is above L, it will also get the combined probability 1.0. Now suppose L is labeled with "N". Almost all of the points below it are "N", so it will get a very low combined probability (e.g., about 0.07). The same is actually true for all points below X, so the value of X should be greater than 0.07 and at most 1.0. However, the actual value that should be assigned to X is unclear. So although X gets a combined probability of 1.0 when L is porn, it is not that sure that it actually is porn (L could be some rater error or other random fluctuation).

A modification can be applied such that the combined probability of the actual point X is not used for determining whether X has the property P. Instead, the n-th highest combined probability among all points that are "below" X (i.e. have all coordinates less or equal to the coordinates of X) can be used to determine the combined probability. The value of n can vary (e.g., n=20). Additionally, to determine the value of n for particular purposes, a cross-validation measurement can be used to find n. This n-th score is compared with the threshold. This threshold has less physical meaning as it can not be directly translated into the probability. However, in practice, the object is to identify a "top n most suspicious documents", where boosting the documents where there is more confidence (based on lower results for other documents) improves the final results.

Other Applications of Using a Multiple Classifier Model to Identify Documents Having a Particular Topic Search:

When users search for documents the system can show predominantly documents that match a certain topic if the system can determine, from circumstances of the search, that the user is likely looking for documents of a particular topic, e.g. if the query is issued from a page with a certain topic (e.g., a financial site, a site on sports, etc.). Additionally, the system can filter documents that are adult oriented if the user activated a filter for such material.

Advertising:

When matching advertising campaigns to Web sites to present the advertisement, the system can suggest Web sites with a topic that matches the advertising campaign, e.g. the system suggests advertising on sports related Web sites for a manufacturer of sports equipment. Alternatively, the system can filter Web sites related to offending topics (pornography, graphic depictions of violence).

Main Document Language as "Topic":

Although the language of a document is not typically considered a "topic", the detection of documents of a certain language has similarities to the detection of documents about a certain topic. In particular, the detection of the main language of a document can also be a problem that multiple classifiers are applied to. For example, from combining the signals of different classifiers including a text of main content (this can be empty or too short to identify a language, the page could just contain a picture with a name, or pictures and text could be combined in one image; there could be parts in different languages, and it is not easy to determine programmatically which part is the main content), text of title (can be ambiguous if title is short), text of other documents on the same site (could be ambiguous for multi-language sites), and text in images obtained by OCR (if there are images and OCR is successful in extracting text).

Similarly to topics, users often will only be interested in documents in a particular language or set of languages. These languages can either be given explicitly by the user or be inferred from the interface language or the language of the query or the country from which the query was issued.

Figure 6:
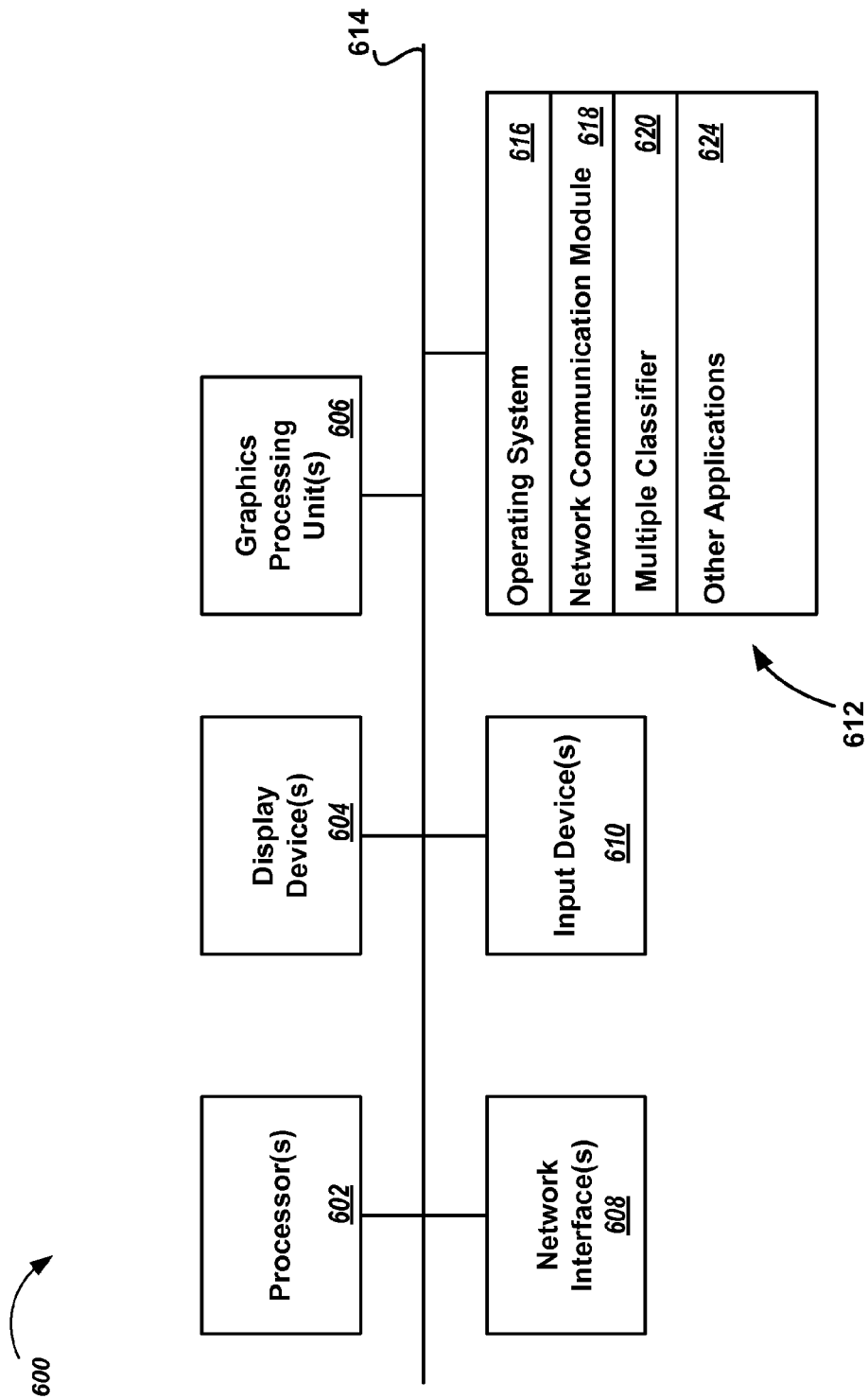
FIG. 6 is a schematic diagram of an example system.

FIG. 6 illustrates an example architecture of a system 600. The system architecture 600 is capable of performing operations for identifying non-compositional compounds. The architecture 600 includes one or more processors 602 (e.g., IBM PowerPC, Intel Pentium 4, etc.), one or more display devices 604 (e.g., CRT, LCD), graphics processing units 606 (e.g., NVIDIA GeForce, etc.), a network interface 608 (e.g., Ethernet, FireWire, USB, etc.), input devices 610 (e.g., keyboard, mouse, etc.), and one or more computer-readable mediums 612. These components exchange communications and data using one or more buses 614 (e.g., EISA, PCI, PCI Express, etc.).

The term "computer-readable medium" refers to any medium that participates in providing instructions to a processor 602 for execution. The computer-readable medium 612 further includes an operating system 616 (e.g., Mac OS®, Windows®, Linux, etc.), a network communication module 618, multiple classifier 622, and other applications 624.

The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on computer-readable mediums 612 (e.g., memory or a storage device); controlling peripheral devices (e.g., disk drives, printers, etc.); and managing traffic on the one or more buses 614. The network communications module 618 includes various components for establishing and maintaining network connections (e.g., software for implementing communication protocols, such as TCP/IP, HTTP, Ethernet, etc.).

The multiple classifier 620 provides various software components for performing the various functions for combining classifier scores into a single classifier score, as described with respect to FIGS. 1-4.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
computing multiple respective scores for each document in a collection of documents, one score from each of a plurality of D distinct classifiers, wherein each classifier computes a respective score representing a likelihood that the document has a property P, wherein each classifier has a respective lower threshold $a_j$, wherein documents having a score less than $a_j$ are unlikely to have the property P, and wherein each classifier has a respective upper threshold $b_j$, wherein documents having a score greater than $b_j$ are likely to have the property P;
determining, for each respective classifier, a plurality of intervals between $a_j$ and $b_j$ for the classifier;
determining, for each document in the collection of documents, a combination of intervals $I_1^1$ to $I_D^K$ according to which interval of the plurality of intervals each respective score for the document belongs;

determining, for each combination of intervals $I_j^1$ to $I_j^K$, whether any documents in the collection of documents have a corresponding combination of intervals $I_1^1$ to $I_D^K$;

selecting no more than M documents for each combination of intervals $I_j^1$ to $I_j^K$ for which at least one document in the collection has the corresponding combination of intervals; and training a multiple classifier model for the D distinct classifiers using each selected document.

2. The method of claim 1, wherein determining, for each respective classifier, a plurality of intervals between $a_j$ and $b_j$ for the classifier comprises determining K intervals for each distinct classifier.

3. The method of claim 2, wherein selecting no more than M documents for each combination of intervals comprises selecting no more than N total documents, wherein N is an upper bound on a number of documents selected.

4. The method of claim 3, further comprising:
determining K such that K is the smallest integer that satisfies $K^D >= N$.

5. The method of claim 4, further comprising:
determining, for each classifier, a middle score $m_j$, wherein determining a plurality of intervals between $a_j$ and $b_j$ for each classifier comprises determining K/2 intervals between $a_j$ and $m_j$ and K/2 intervals between $m_j$ and $b_j$.

6. The method of claim 5, wherein determining, for each classifier, the middle score $m_j$ comprises determining the middle score $m_j$ such that a ratio of documents having a score greater than $m_j$ is a ratio of documents having the property P.

7. The method of claim 1, wherein substantially half of the selected documents have the property P.

8. The method of claim 1, further comprising:
providing each selected document to one or more human raters; and
receiving, from the one or more human raters, an indication of whether or not each document has the property P.

9. The method of claim 1, wherein training the multiple classifier model comprises training a monotonic regression model.

10. A system comprising:
one or more computers and one or more storage devices storing instructions that are operable, when executed by the one or more computers, to cause the one or more computers to perform operations comprising:
computing multiple respective scores for each document in a collection of documents, one score from each of a plurality of D distinct classifiers, wherein each classifier computes a respective score representing a likelihood that the document has a property P, wherein each classifier has a respective lower threshold $a_j$, wherein documents having a score less than $a_j$ are unlikely to have the property P, and wherein each classifier has a respective upper threshold $b_j$, wherein documents having a score greater than $b_j$ are likely to have the property P;
determining, for each respective classifier, a plurality of intervals between $a_j$ and $b_j$ for the classifier;
determining, for each document in the collection of documents, a combination of intervals $I_1^1$ to $I_D^K$ according to which interval of the plurality of intervals each respective score for the document belongs;
determining, for each combination of intervals $I_j^1$ to $I_j^K$, whether any documents in the collection of documents have a corresponding combination of intervals $I_1^1$ to $I_D^K$;

selecting no more than M documents for each combination of intervals $I_j^1$ to $I_j^K$ for which at least one document in the collection has the corresponding combination of intervals; and training a multiple classifier model for the D distinct classifiers using each selected document.

11. The system of claim 10, wherein determining, for each respective classifier, a plurality of intervals between $a_j$ and $b_j$ for the classifier comprises determining K intervals for each distinct classifier.

12. The system of claim 11, wherein selecting no more than M documents for each combination of intervals comprises selecting no more than N total documents, wherein N is an upper bound on a number of documents selected.

13. The system of claim 12, wherein the operations further comprise:
determining K such that K is the smallest integer that satisfies $K^D >= N$.

14. The system of claim 13, wherein the operations further comprise:
determining, for each classifier, a middle score $m_j$, wherein determining a plurality of intervals between $a_j$ and $b_j$ for each classifier comprises determining K/2 intervals between $a_j$ and $m_j$ and K/2 intervals between $m_j$ and $b_j$.

15. The system of claim 14, wherein determining, for each classifier, the middle score $m_j$ comprises determining the middle score $m_j$ such that a ratio of documents having a score greater than $m_j$ is a ratio of documents having the property P.

16. The system of claim 10, wherein substantially half of the selected documents have the property P.

17. The system of claim 10, wherein the operations further comprise:
providing each selected document to one or more human raters; and
receiving, from the one or more human raters, an indication of whether or not each document has the property P.

18. The system of claim 10, wherein training the multiple classifier model comprises training a monotonic regression model.

19. A computer program product, encoded on one or more non-transitory computer storage media, comprising instructions that when executed by one or more computers cause the one or more computers to perform operations comprising:
computing multiple respective scores for each document in a collection of documents, one score from each of a plurality of D distinct classifiers, wherein each classifier computes a respective score representing a likelihood that the document has a property P, wherein each classifier has a respective lower threshold $a_j$, wherein documents having a score less than $a_j$ are unlikely to have the property P, and wherein each classifier has a respective upper threshold $b_j$, wherein documents having a score greater than $b_j$ are likely to have the property P;
determining, for each respective classifier, a plurality of intervals between $a_j$ and $b_j$ for the classifier;
determining, for each document in the collection of documents, a combination of intervals $I_1^1$ to $I_D^K$ according to which interval of the plurality of intervals each respective score for the document belongs;
determining, for each combination of intervals to $I_j^1$ to $I_j^K$, whether any documents in the collection of documents have a corresponding combination of intervals $I_1^1$ to $I_D^K$;
selecting no more than M documents for each combination of intervals $I_j^1$ to $I_j^K$ for which at least one document in the collection has the corresponding combination of intervals; and training a multiple classifier model for the D distinct classifiers using each selected document.

20. The computer program product of claim 19, wherein determining, for each respective classifier, a plurality of intervals between aj and bj for the classifier comprises determining K intervals for each distinct classifier.

* * * * *